United States Patent
Foody et al.

(10) Patent No.: US 10,202,312 B2
(45) Date of Patent: *Feb. 12, 2019

(54) PROCESS FOR PRODUCING A FUEL FROM LIGNOCELLULOSIC FEEDSTOCK

(71) Applicant: Iogen Energy Corporation, Ottawa (CA)

(72) Inventors: Patrick J. Foody, Ottawa (CA); Robert Glenns, Ottawa (CA)

(73) Assignee: Iogen Energy Corporation, Ottawa, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/057,644

(22) Filed: Mar. 1, 2016

(65) Prior Publication Data
US 2016/0176767 A1 Jun. 23, 2016

Related U.S. Application Data

(63) Continuation of application No. 14/376,975, filed as application No. PCT/CA2013/050164 on Mar. 5, 2013, now Pat. No. 9,315,427.

(Continued)

(51) Int. Cl.
*C05G 1/00* (2006.01)
*C12F 3/10* (2006.01)
(Continued)

(52) U.S. Cl.
CPC ............... *C05C 11/00* (2013.01); *C05C 3/00* (2013.01); *C05D 9/00* (2013.01); *C05F 5/008* (2013.01);
(Continued)

(58) Field of Classification Search
CPC ..................................... C05G 1/00; C12F 3/10
See application file for complete search history.

(56) References Cited

U.S. PATENT DOCUMENTS

| | | | |
|---|---|---|---|
| 1,225,825 | A | 5/1917 | Kressel |
| 1,799,176 | A | 4/1931 | Metzl |

(Continued)

FOREIGN PATENT DOCUMENTS

| | | |
|---|---|---|
| CN | 101007957 A | 8/2007 |
| CN | 101148458 A | 3/2008 |

(Continued)

OTHER PUBLICATIONS

Belyea et al., "Element Concentrations of Dry-Grind Corn-Processing Streams", Applied Biochemistry and Biotechnology, vol. 134 (2006) 113-28.

(Continued)

*Primary Examiner* — Wayne A Langel
(74) *Attorney, Agent, or Firm* — Venable LLP

(57) ABSTRACT

The present invention relates to a method for producing a composition for use in land application. The method comprises: (a) obtaining a fermentation product by a production process comprising the steps of: (i) treating lignocellulosic feedstock to produce sugar; (ii) fermenting the sugar to produce a fermented mixture comprising the fermentation product; and (iii) recovering the fermentation product from the fermented mixture in one or more stages to produce a concentrated fermentation product and still bottoms; and
(b) recovering the still bottoms, the still bottoms comprising organic and inorganic components; and (c) providing the still bottoms for use in a land application. Also provided is a soil conditioning composition for use in land application. The soil conditioning composition contains still bottoms and optionally other components.

21 Claims, 7 Drawing Sheets

Related U.S. Application Data

(60) Provisional application No. 61/634,758, filed on Mar. 5, 2012.

(51) Int. Cl.

| | |
|---|---|
| *C05F 3/00* | (2006.01) |
| *C09K 17/40* | (2006.01) |
| *C05G 3/04* | (2006.01) |
| *C05D 9/00* | (2006.01) |
| *C05C 11/00* | (2006.01) |
| *C13K 1/02* | (2006.01) |
| *C05C 3/00* | (2006.01) |
| *C05F 5/00* | (2006.01) |
| *C13K 13/00* | (2006.01) |

(52) U.S. Cl.
CPC ............... *C05G 1/00* (2013.01); *C05G 3/04* (2013.01); *C09K 17/40* (2013.01); *C12F 3/10* (2013.01); *C13K 1/02* (2013.01); *C13K 13/002* (2013.01)

(56) References Cited

U.S. PATENT DOCUMENTS

| | | | |
|---|---|---|---|
| 2,714,553 A | 8/1955 | Bibb | |
| 2,842,534 A | 7/1958 | Doughty | |
| 3,163,517 A | 12/1964 | May et al. | |
| 3,337,326 A | 8/1967 | May | |
| 4,287,304 A | 9/1981 | Muller et al. | |
| 4,448,881 A | 5/1984 | Muller et al. | |
| 6,444,437 B1 | 9/2002 | Sporleder et al. | |
| 7,074,251 B1 | 7/2006 | Rogers et al. | |
| 7,585,652 B2 | 9/2009 | Foody et al. | |
| 7,604,743 B2 | 10/2009 | Hirl | |
| 7,670,813 B2 | 3/2010 | Foody et al. | |
| 8,017,365 B1 | 9/2011 | Rein et al. | |
| 8,247,203 B2 | 8/2012 | Foody et al. | |
| 8,252,350 B1 | 8/2012 | Cadwalader et al. | |
| 8,980,599 B2 | 3/2015 | Tolan et al. | |
| 9,315,427 B2 * | 4/2016 | Foody | C05C 3/00 |
| 2003/0111410 A1 | 6/2003 | Branson | |
| 2007/0249029 A1 | 10/2007 | Marshall et al. | |
| 2008/0176303 A1 | 7/2008 | Massie | |
| 2009/0035826 A1 | 2/2009 | Tolan et al. | |
| 2010/0041117 A1 | 2/2010 | Hirl | |
| 2011/0020884 A1 | 1/2011 | Latouf et al. | |
| 2012/0190092 A1 | 7/2012 | Jaquess et al. | |
| 2012/0329096 A1 | 12/2012 | Foody et al. | |
| 2014/0235438 A1 * | 8/2014 | Thompson | C05D 3/02 504/100 |
| 2014/0248676 A1 * | 9/2014 | Griffin | D21C 11/0007 435/165 |
| 2014/0366596 A1 | 12/2014 | Young et al. | |

FOREIGN PATENT DOCUMENTS

| | | |
|---|---|---|
| CN | 101186943 A | 5/2008 |
| CN | 101691537 A | 4/2010 |
| EP | 0091532 A1 | 10/1983 |
| WO | 98/58071 A1 | 12/1998 |
| WO | 2006/021087 A1 | 3/2006 |
| WO | 2007/009463 A2 | 1/2007 |
| WO | 2008/040358 A1 | 4/2008 |

OTHER PUBLICATIONS

Cortez et al., "Experiences on Vinasse Disposal, Part III: Combustion of Vinasse—#6 Fuel Oil Emulsions", Brazilian Journal of Chemical Engineering, vol. 14, No. 1 (1997).

Kennedy/Jenks Consultants, "Land Application of Winery Stillage and Non-Stillage Process Water Study Results and Proposed Guidelines", Aug. 2004, K/J 020112.01.

Lee et al. "Recovery of ammonium sulfate from fermentation waste by electrodialysis" Water Research, vol. 37 (2003) 1091-99.

Monnet "An Introduction to Anaerobic Digestion of Organic Wastes—Final Report" (2003).

Omolola, "Anaerobic Digestion of Ethanol Distillery Waste-Stillage for Biogas Production", Thesis Research Report (2007) 318-26.

Rodriguez, "Effects of Vinasse on Sugarcane Productivity", Rev. Fac. Agron., vol. 17 (2000) 318-26.

Sweet Sorghum Ethanol Association Discussion Board, "Sweet Sorghum Vinasse Composition", http://www.sseassociation.org/component/fireboard/?func=view&catid=10&id=63, Accessed Feb. 27, 2012.

Taherzadeh et al., "Acid-Based Hydrolysis Processes for Ethanol from Lignocellulosic Materials: A Review", Bioethanol review, BioResources, vol. 2, No. 3 (2007) 472-99.

Tomczak-Wandzel et al., "Anaerobic Treatment of Distillery Wastewater", 11-20.

Wilkie et al., "Stillage characterization and anaerobic treatment of ethanol stillage from conventional and cellulosic feedstocks", Biomass & Bioenergy, vol. 19 (2000) 63-102.

Willington et al., "Options for Handling Stillage Waste from Sugar-Based Fuel Ethanol Production," Resources and Conservation, vol. 8 (1982) 111-129.

Merrick & Company, "Wastewater Treatment Options for the Biomass-To-Ethanol Process," Task 6, Subcontract No. AXE-8-18020-01, Merrick Project No. 19013104, Oct. 22, 1998 (298 pages), (available at: http://infohouse.p2ric.org/ref/22/21201.pdf).

International Search Report issued in PCT/CA2013/050164 dated Apr. 25, 2013 (2 pages).

A. Christensen & S. Siddiqui, "Fuel price impacts and compliance costs associated with the Renewable Fuel Standard (RFS)," Energy Policy, 86, pp. 614-624 (2015).

* cited by examiner

PROCESS FOR PRODUCING A FUEL FROM LIGNOCELLULOSIC FEEDSTOCK

CROSS-REFERENCE TO RELATED APPLICATIONS

This application is a continuation of U.S. patent application Ser. No. 14/376,975, filed on Aug. 6, 2014, which is a national stage application of PCT/CA2013/050164 having an international filing date of Mar. 5, 2013, which claims benefit of U.S. Provisional Application No. 61/634,758, filed Mar. 5, 2012. The entire contents of the aforementioned applications are incorporated by reference herein.

TECHNICAL FIELD

The present invention relates to a composition for use in land application and methods for producing same.

BACKGROUND OF THE INVENTION

Fuel ethanol is currently produced from feedstocks such as corn starch, sugar cane, and sugar beets. However, the production of ethanol from lignocellulose-containing feedstocks, such as agricultural wastes and forestry wastes has received much attention in recent years. An advantage of using these feedstocks is that they are widely available and can be obtained at low cost. Furthermore, a byproduct of the conversion process, known as lignin, can be used as a fuel to power the process instead of fossil fuels. Several studies have concluded that, when the entire production and consumption cycle is taken into account, the use of ethanol produced from cellulose generates close to nil greenhouse gases.

The processing steps for converting lignocellulosic feedstock to ethanol, or other fuels and chemicals, involve breaking down the fibrous lignocellulosic material by a series of chemical and biological treatments to liberate sugar monomers from the feedstock. There are various known methods for producing fermentable sugars from lignocellulosic feedstocks, one of which involves a chemical pretreatment followed by hydrolysis of cellulose with cellulase enzymes and β-glucosidase. The sugars produced in hydrolysis are fermented to a fermentation product in a fermentation carried out subsequent to, or during the hydrolysis of cellulose, using a microorganism such as yeast or bacteria. The fermentation product produced from the lignocellulosic feedstock may be concentrated by any suitable technique. For example, in the production of ethanol, distillation is carried out subsequent to fermentation to recover the ethanol in concentrated form and residual water is subsequently removed by molecular sieves or by other techniques. The residue remaining after concentrating the fermentation product is referred to as "still bottoms" or a "still bottoms stream".

Although there have been research efforts devoted to producing fuel or other chemicals from lignocellulosic feedstock, the existing technologies have been difficult to commercialize. At present, the cost of producing fuels and other chemicals from lignocellulosic feedstock is still relatively high.

One problem with processes for converting lignocellulosic feedstock to a fuel or other chemical is that the handling and disposal of the still bottoms presents challenges. Disposal of still bottoms is costly, complex and has negative environmental implications. A disposal method that has been proposed for still bottoms derived from cellulosic conversion processes is biological waste water treatment. Another known waste disposal option is incineration, which allows the recovery of heat from the combustion of organics. A further option available for disposal is landfilling the still bottoms. While technically feasible, many of these options for handling and/or disposing of still bottoms require significant capital and operation expenditure. Furthermore, processing the still bottoms to recover inorganic sulfate salts by ion exclusion and using the recovered salts as a fertilizer has also been disclosed, as set forth in U.S. Pat. No. 7,670,813. However, it would be desirable to provide improved or alternate methods for managing still bottoms streams comprising salts arising from processes for producing fermentation products from lignocellulosic feedstocks.

SUMMARY OF THE INVENTION

The process of the present invention overcomes, ameliorates or provides useful alternatives in relation to known processes for handling and disposing of waste streams arising during the processing of lignocellulosic feedstocks to produce a fermentation product for use as a fuel or chemical.

According to a first aspect, the present invention provides a process for obtaining a composition for use in soil conditioning or land application from a process that produces a fermentation product from a lignocellulosic feedstock. The process comprises: (a) producing the fermentation product by a production process comprising: (i) treating the lignocellulosic feedstock to produce sugar; (ii) fermenting the sugar to produce a fermented mixture comprising the fermentation product; and (iii) recovering the fermentation product from the fermented mixture in one or more stages to produce a concentrated fermentation product and still bottoms. The still bottoms are recovered and subsequently provided for use in a land application or soil conditioning.

Advantageously, the still bottoms comprise organic and inorganic components, both of which can provide benefits to soils. The inorganic components satisfy nutrients for plant growth, for example nitrogen, sulfur and potassium. In addition, the organic components of the still bottoms improve soil condition by increasing the water holding capacity, improving soil health and/or reducing erosion of top soil. Results presented herein show that still bottoms arising from production processes using lignocellulosic feedstocks provide similar nutrient uptake in crops as chemical fertilizer. Further, as described herein, test results show that the still bottoms are not toxic to the plants. Crops that were treated with still bottoms of the invention had a similar number of plants/hectare as crops treated with chemical fertilizer.

In addition to these benefits to crops, the method disclosed herein provides a simpler alternative to the disposal of waste that results when producing a fermentation product from a lignocellulosic feedstock. In contrast to other methods proposed for disposal of still bottoms, the present invention offers reduced operating and capital costs. For example, incineration and waste water treatment of still bottoms requires significant capital to implement and high operating costs for the plant. Landfilling is also a costly alternative and has negative environmental implications. Thus, the present invention provides a low cost soil conditioning composition from a waste stream that would otherwise require significant capital and operating cost for disposal.

Furthermore, the present invention overcomes concerns arising from removing crop residue remaining on a field after a crop has been harvested. In particular, there have been concerns that removing crop residues to make fuels and chemicals removes water, carbon, and nutrients from the soil. On the other hand, it is often desirable to remove crop residue build-up, especially from high yield crops, as excessive residue can be difficult and expensive to manage. Advantageously, the present invention addresses concerns regarding crop residue management, while also providing a cost-effective means for returning organic matter and nutrients back to the soil.

In addition, by carrying out the present invention, life cycle greenhouse gas emissions associated with production of a fuel from a lignocellulosic feedstock are reduced relative to fuel production processes that dispose of the still bottoms by other techniques, such as incineration or landfilling. The greenhouse gas reductions are achieved because of reduced dependence on chemical fertilizer. As chemical fertilizer is synthesized using fossil fuels such as natural gas and coal, by using nutrients from the still bottoms rather than chemical fertilizer, greenhouse gas emissions savings can be achieved. Furthermore, unlike incineration, the invention does not require the use of scrubbing chemicals, which can also contribute to the life cycle greenhouse gas emissions of the fuel.

According to certain embodiments of the first aspect of the invention, the inorganic components of the still bottoms originate from the lignocellulosic feedstock, process chemicals added during the production process, or a combination thereof. In another embodiment, the inorganic components originate from both the lignocellulosic feedstock and process chemicals added during the production process.

According to a further embodiment of the first aspect of the invention, the step of treating the lignocellulosic feedstock to produce sugar comprises pretreating the lignocellulosic feedstock with acid or alkali to produce a composition comprising cellulose and hydrolyzing at least a portion of the cellulose to glucose with enzymes.

In a second aspect of the invention, the inorganic component of the still bottoms comprises inorganic salt that comprises a sulfur-containing salt. According to this aspect of the invention, the sulfur-containing salt originates in large part from sulfur-containing process chemicals added during the production process. The inventors have recognized that still bottoms comprising sulfur-containing salts originating from the process itself are particularly suitable for use in land application, such as for use as a fertilizer. The sulfur serves as a nutrient for plants, while the organic component provides organic matter for the soil. In addition, this aspect of the invention provides a cost effective methodology for using a waste stream comprising byproducts arising from chemical addition steps that otherwise require complex processes to treat and dispose of. For example, streams containing sulfate salts produce ash in boilers during incineration and are difficult to treat by anaerobic digestion as the salts can reduce the performance of the microorganisms. Not only do certain processes disclosed herein overcome these limitations by reducing or eliminating the need for costly treatment methods, but the sulfur-containing salts contained within the stream add nutrient value to the still bottoms when used in land application.

Thus, according to a second aspect of the invention, there is provided a process for obtaining a composition for use in land application comprising: (a) obtaining a fermentation product by a production process comprising the steps of: (i) treating a lignocellulosic feedstock to produce sugar; (ii) fermenting the sugar to produce a fermented mixture comprising the fermentation product; and (iii) recovering the fermentation product from the fermented mixture in one or more stages to produce a concentrated fermentation product and still bottoms; (b) recovering the still bottoms, the still bottoms comprising an organic and an inorganic component; and (c) providing the still bottoms comprising the organic component and inorganic component for use in a land application, wherein the inorganic component of the still bottoms comprises inorganic salt that arises from one or more sulfur-containing process chemicals that are used during the production process and wherein the inorganic salt is a sulfur-containing salt. According to an embodiment of this aspect of the invention, the one or more sulfur-containing process chemicals that are used during the production process include sulfuric acid. According to another embodiment of this aspect of the invention, the one or more sulfur-containing process chemicals are used during the step of treating the lignocellulosic feedstock to produce sugar. The sulfur-containing salt may be a sulfate salt selected from ammonium sulfate and calcium sulfate. In a preferred embodiment, the sulfate salt is ammonium sulfate.

According to any of the foregoing aspects of the invention, the step of treating the lignocellulosic feedstock to produce sugar may comprise (i') pretreating the lignocellulosic feedstock with sulfuric acid to produce an acid pretreated lignocellulosic feedstock and adding alkali to the acid pretreated lignocellulosic feedstock to adjust the pH between about 4 and about 7, thereby producing a sulfur-containing salt; or (ii') pretreating the lignocellulosic feedstock with alkali to produce an alkali pretreated lignocellulosic feedstock and adding sulfuric acid to the alkali pretreated lignocellulosic feedstock to adjust the pH between about 4 and about 7, thereby producing a sulfur-containing salt, wherein the sulfur-containing salt produced in step (i') or (ii') forms at least part of the inorganic component of the still bottoms.

After the pH adjustment, the pretreated feedstock may be hydrolyzed with an enzyme mixture comprising at least cellulase enzymes. According to certain embodiments of any of the aforesaid aspects of the invention, at least part of the steps of treating to produce sugar and fermenting are carried out as part of a simultaneous saccharification and fermentation process.

The acid pretreated feedstock is preferably adjusted with alkali selected from lime, ammonia and ammonium hydroxide. This produces inorganic salt selected from calcium sulfate and ammonium sulfate. In an embodiment, the acid pretreated feedstock is adjusted with ammonia or ammonium hydroxide, which produces ammonium sulfate. The ammonium sulfate then forms at least part of the inorganic component of the still bottoms. In another embodiment of the invention, the acid pretreated feedstock is adjusted with lime, which produces calcium sulfate.

In yet further embodiments of the invention, in the step of treating the lignocellulosic feedstock to produce sugar, alkali selected from lime, ammonia and ammonium hydroxide is used to pretreat the feedstock to produce alkali pretreated feedstock. When alkali selected from lime, ammonia and ammonium hydroxide are used to pretreat the feedstock, the pH adjustment with sulfuric acid produces inorganic salt selected from ammonium sulfate and calcium sulfate. The ammonium sulfate or calcium sulfate then forms at least part of the inorganic component of the still bottoms. In an embodiment of the invention, the alkali used to pretreat the feedstock is ammonia or ammonium hydroxide, and the alkali pretreated feedstock is adjusted with sulfuric acid which produces ammonium sulfate. The ammonium sulfate then forms at least part of the inorganic component of the still bottoms. Ammonium sulfate provides nitrogen and sulfur in the still bottoms, both of which can increase the nutrient content of soil.

According to an embodiment of any of the foregoing aspects of the invention, the still bottoms has a sulfur content of between about 1.0 and about 15 wt %, between about 1.0 and about 12 wt %, between about 1.5 and about 12 wt % or between about 2.0 and about 8 wt % as measured on a dry basis. In yet further embodiments, the still bottoms has a sulfur content of between about 0.5 and about 15 wt %, between about 0.5 and about 12 wt % or between about 0.5 and about 8 wt %. The sulfur content may include ranges having numerical limits of about 0.5, 1.0, 1.5, 2.0, 3.0, 4.0, 5.0, 6.0, 7.0, 8.0, 9.0, 10, 11, 12, 13, 14 or 15 wt % as measured on a dry basis.

According to an embodiment of any of the foregoing aspects of the invention, the still bottoms has a nitrogen content of between about 2.0 and about 12 wt %, between about 2.0 and about 10 wt %, or between about 2.0 and about 8 wt % on a dry basis. In further embodiments, the soil conditioning composition has a nitrogen content of between about 1.0 and about 15 wt %, between about 1.0 and about 12 wt %, between about 1.0 and about 10 wt % or between about 1.0 and about 8 wt % on a dry basis. The nitrogen content may include ranges having numerical limits of about 0.5, 1.0, 1.5, 2.0, 3.0, 4.0, 5.0, 6.0, 7.0, 8.0, 9.0, 10, 11, 12, 13, 14 or 15 wt % as measured on a dry basis.

In another embodiment of the invention, the still bottoms has a phosphorus content of less than 2 wt % as measured on a dry basis.

In certain embodiments of the invention, the still bottoms provided for use in the land application comprises about 40-80 wt % organic components and about 20-60 wt % inorganic components measured on a dry basis. The organic component may comprise dissolved lignin, insoluble lignin or a combination thereof.

In a further embodiment of any of the foregoing aspects of the invention, the still bottoms has a solids content that allows it to be land applied through conventional farming equipment.

The step of recovering in any of the foregoing aspects of the invention may comprise concentrating the still bottoms. In a further embodiment, the step of recovering comprises separating solids from the still bottoms, thereby producing a residue stream composed of separated solids and a liquid component and wherein the separated solids and the liquid component are each provided for use in soil conditioning.

In an embodiment of either of the foregoing aspects of the invention, the still bottoms are directly applied to land or concentrated and then applied directly to land, without any intervening waste water treatment, including biological or chemical treatment.

According to a further aspect, the present invention provides a method for using still bottoms as a fertilizer or soil conditioning composition comprising applying to land still bottoms produced by a production process that utilizes a lignocellulosic feedstock to produce a fermentation product.

According to certain embodiments of this aspect of the invention, the soil conditioning composition comprises about 40-80 wt % organic components and about 20-60 wt % inorganic components, on a dry basis. The inorganic components may originate from the lignocellulosic feedstock, process chemicals added during the production process, or a combination thereof. Preferably, the inorganic components originate from both the lignocellulosic feedstock and process chemicals added during the production process. The organic components may comprise dissolved lignin, insoluble lignin, or a combination thereof. Other organic components include residual carbohydrates, non-fermented sugars, polyols, fermentation solids or a combination thereof. According to one embodiment, there is no insoluble lignin.

According to further embodiments, the still bottoms component of the conditioning composition has a phosphorus content of less than about 2 wt % measured on a dry basis.

The method of the invention may further comprise mixing the soil conditioning composition with manure prior to the step of applying it to land.

According to another aspect, the invention provides a soil conditioning composition comprising: still bottoms comprising: about 40-80 wt % organic component; and about 20-60 wt % inorganic component, wherein the organic component comprises soluble lignin and the inorganic component comprises nitrogen and sulfur.

The water content of the soil conditioning composition may be between about 10 and about 90 wt %, or between about 20 and about 50 wt %. In further embodiments, the soil conditioning composition is composed of separated still bottoms solids resulting from a step of separating solids from a still bottoms stream.

The organic component of the soil conditioning composition may comprise residual carbohydrates, non-fermented sugars, polyols, fermentation solids, dissolved lignin, or a combination thereof. The organic component of the soil conditioning composition may further comprise insoluble lignin. In further embodiments of the invention, the soil conditioning composition further comprises potassium, chloride, magnesium, calcium, or a combination thereof. In yet further embodiments, the still bottoms in the soil conditioning composition has a phosphorus content of less than 2 wt % on a dry basis.

According to an embodiment of the invention, the soil conditioning composition has a sulfur content of between about 1.0 and about 15 wt %, between about 1.0 and about 12 wt %, between about 1.5 and about 12 wt % or between about 2.0 and about 8 wt % as measured on a dry basis. In yet further embodiments, the still bottoms has a sulfur content of between about 0.5 and about 15 wt %, between about 0.5 and about 12 wt % or between about 0.5 and about 8 wt %. The sulfur content may include ranges having numerical limits of about 0.5, 1.0, 1.5, 2.0, 3.0, 4.0, 5.0, 6.0, 7.0, 8.0, 9.0, 10, 11, 12, 13, 14 or 15 wt % as measured on a dry basis.

According to an embodiment of the invention, the soil conditioning composition has a nitrogen content of between about 2.0 and about 12 wt %, between about 2.0 and about 10 wt %, or between about 2.0 and about 8 wt % on a dry basis. In further embodiments, the soil conditioning composition has a nitrogen content of between about 1.0 and about 15 wt %, between about 1.0 and about 12 wt %, between about 1.0 and about 10 wt % or between about 1.0 and about 8 wt % on a dry basis. The nitrogen content may include ranges having numerical limits of about 0.5, 1.0, 1.5, 2.0, 3.0, 4.0, 5.0, 6.0, 7.0, 8.0, 9.0, 10, 11, 12, 13, 14 or 15 wt % as measured on a dry basis.

According to a further embodiment of the invention, the inorganic component of the soil conditioning composition comprises a sulfate salt. In another embodiment of the invention, the inorganic component comprises ammonium sulfate or calcium sulfate. In yet a further embodiment, the inorganic component comprises ammonium sulfate.

In a further aspect, the present invention provides a soil conditioning composition for use in land application that comprises still bottoms, wherein the still bottoms are derived from a method that produces a fermentation product from a lignocellulosic feedstock.

According to another aspect of the invention there is provided a method comprising (i) obtaining a soil conditioning composition that comprises still bottoms, wherein the still bottoms are derived from a method that produces a fermentation product from a lignocellulosic feedstock; and (ii) adding insoluble lignin to the soil conditioning composition of step (i) prior to its use in land application.

DETAILED DESCRIPTION OF THE INVENTION

Figure 1:
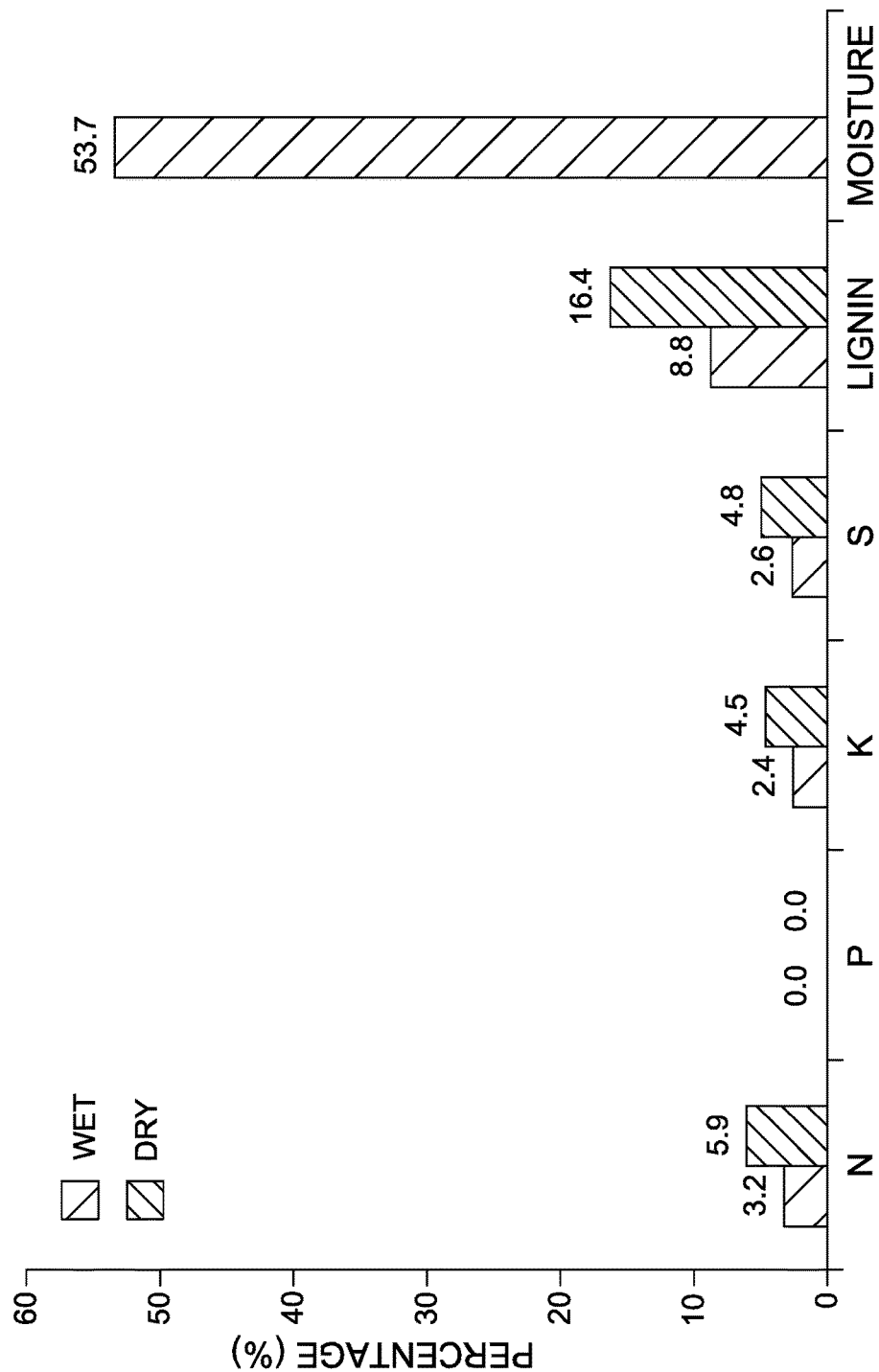
FIG. 1 is a bar graph showing the nitrogen (N), phosphorus (P), potassium (K), sulfur (S), lignin and moisture content of a soil conditioning composition comprising still bottoms. The nitrogen, phosphorus, potassium, sulfur, lignin and moisture content of the still bottoms are measured on a wet (first bars) or dry basis (second bars).

The following description is of a preferred embodiment by way of example only and without limitation to the combination of features necessary for carrying the invention into effect. The headings provided are not meant to be limiting of the various embodiments of the invention. Terms such as "comprises", "comprising", "comprise", "includes", "including" and "include" are not meant to be limiting.

The process of the present invention comprises producing sugar from a lignocellulosic feedstock and fermenting the sugar to produce a fermentation product in the same or different stages. The fermentation product includes any product or byproduct of the fermentation for use as a fuel, fuel intermediate or chemical. In one embodiment of the invention, the fermentation product is an alcohol.

Description of Feedstock Types

By the term "lignocellulosic feedstock", it is meant any type of woody or non-woody plant biomass, or feedstock derived from plant biomass, such as, but not limited to,
  (i) biomass crops such as, dedicated biomass crops, including, but not limited to, grasses, for example, C4 grasses, such as switch grass, cord grass, rye grass, miscanthus, reed canary grass, or a combination thereof;
  (ii) residues, byproducts or waste from the processing of plant biomass, or feedstock derived from plant biomass, in a facility to yield food or non-food products, for example, but not limited to, residues remaining after obtaining sugar from plant biomass such as sugar cane bagasse, beet pulp, or residues remaining after removing sugar from Jerusalem artichoke, or a combination thereof; and residues remaining after grain processing, such as corn fiber, corn stover, or a combination thereof;
  (iii) agricultural residues, for example, but not limited to, soybean stover, corn stover, rice straw, sugar cane straw, rice hulls, barley straw, corn cobs, wheat straw, canola straw, oat straw, oat hulls, corn fiber, or a combination thereof;
  (iv) forestry biomass for example, but not limited to, recycled wood pulp fiber, sawdust, hardwood, for example aspen wood, softwood, or a combination thereof;
  (v) waste material derived from pulp and paper products such as newsprint, cardboard, or a combination thereof and
  (vi) municipal waste.

Lignocellulosic feedstock may comprise one species of fiber or, alternatively, lignocellulosic feedstock may comprise a mixture of fibers that originate from different lignocellulosic feedstocks. In addition, the lignocellulosic feedstock may comprise fresh lignocellulosic feedstock, partially dried lignocellulosic feedstock, fully dried lignocellulosic feedstock, or a combination thereof. Moreover, new lignocellulosic feedstock varieties may be produced from any of those listed above by plant breeding or by genetic engineering.

Lignocellulosic feedstocks comprise cellulose in an amount greater than about 20%, more preferably greater than about 30%, more preferably greater than about 40% (w/w). For example, the lignocellulosic material may comprise from about 20% to about 50% (w/w) cellulose, or any amount therebetween. Furthermore, the lignocellulosic feedstock comprises lignin in an amount greater than about 10%, more typically in an amount greater than about 15% (w/w). Preferably, the lignocellulosic feedstock comprises about 25% to about 45% (w/w) cellulose, about 15% to about 35% (w/w) xylan and about 10% to about 25% (w/w) lignin. The lignocellulosic feedstock may also comprise sucrose, fructose and starch. Without being limiting, the amount of sucrose, fructose or starch present in lignocellulosic feedstocks is generally less than cellulose and xylan.

The lignocellulosic feedstock may be first subjected to size reduction by methods including, but not limited to, milling, grinding, agitation, shredding, compression/expansion, or other types of mechanical action. The lignocellulosic feedstock from the size reduction process may produce a size-reduced feedstock comprising particles of a defined length. For example, at least 90% by weight of the particles in the size reduced feedstock may have a length less than between about ⅛ and about 8 inches. As would be appreciated by those of ordinary skill in the art, lignocellulosic feedstock that has been subjected to size reduction comprises feedstock particles having a range of sizes and shapes.

The feedstock is optionally slurried. Slurrying of the feedstock allows it to be pumped readily and may be carried out in any suitable batch or continuous mixing vessel, including a standpipe or pulper. Slurrying may be distinct from the water and chemical addition or may occur simultaneously therewith.

Slurrying can occur at any suitable consistency selected by those of ordinary skill in the art. However, in practice, the consistency of the incoming feedstock slurry utilized will depend on the specific mixing means employed and the specific pumps used. In one embodiment of the invention, the consistency of the feedstock slurry is between about 2% and about 40% (w/w) or more typically between about 4% and about 30% (w/w).

Treatment of the Lignocellulosic Feedstock to Produce Sugar

Any of a variety of methods may be employed for treating lignocellulosic feedstock to produce sugar, including treating the lignocellulosic feedstock using mechanical, chemical, thermal and/or biological treatments. Fermentable sugar may be obtained from lignocellulosic feedstock using techniques that are known to those of ordinary skill in the art, or later-developed techniques, including, but not limited to those described below. Treating the lignocellulosic feedstock to produce sugar may be a single treatment or more preferably is carried out in multiple stages.

The lignocellulosic feedstock may be pretreated by reacting it under conditions that disrupt the fiber structure and that increase the susceptibility or accessibility of cellulose within the cellulosic fibers for subsequent conversion steps, such as enzymatic hydrolysis. In one embodiment of the invention, the pretreatment is performed so that a high degree of hydrolysis of the hemicellulose and only a small amount of conversion of cellulose to glucose occurs. Pretreatment may be conducted in one or multiple stages. The cellulose may be hydrolysed to glucose in a subsequent step that uses cellulase enzymes.

For acid pretreatment, the pH is typically between about 0.4 and about 3.5. Acid pretreatment is preferably carried out at a maximum temperature of about 160° C. to about 280° C. The time that the feedstock is held at this temperature may be about 6 seconds to about 3600 seconds. The pretreatment is typically carried out under pressure. For example, the pressure during pretreatment may be between about 350 and about 6500 kPa, or any pressure range therebetween. The feedstock may be heated with steam during or prior to pretreatment.

The acid pretreatment produces a composition comprising an acid pretreated feedstock. Sugars produced by the hydrolysis of hemicellulose during acid pretreatment include xylose, glucose, arabinose, mannose, galactose or a combination thereof.

Pretreatment may also be carried out under alkaline conditions. Examples of suitable alkaline pretreatment processes include ammonia fiber expansion (AFEX) or dilute ammonia pretreatment. Other pretreatment methods include mechanical and hydrothermal pretreatment and pretreatment with organic solvents (known in the industry as Organosolv™ pretreatment).

According to one exemplary embodiment of the invention, the soluble components of the pretreated feedstock composition are separated from the solids. The aqueous stream, which includes the sugars released during pretreatment, the pretreatment chemical and other soluble components, may then be fermented using a microorganism capable of fermenting the sugars derived from the hemicellulose component of the feedstock.

Subsequent to pretreatment, the pretreated feedstock slurry is typically cooled to decrease its temperature to a range at which the cellulase enzymes are active. It should be appreciated that cooling of the feedstock can occur in a number of stages utilizing flashing, heat exchange or other suitable means.

Enzymatic Hydrolysis

The hydrolysis of the cellulose to soluble sugars can be carried out with any type of cellulase enzymes suitable for such purpose and effective at the pH and other conditions utilized, regardless of their source. Among the most widely studied, characterized and commercially produced cellulases are those obtained from fungi of the genera *Aspergillus, Humicola, Chrysosporium, Melanocarpus, Myceliophthora, Sporotrichum* and *Trichoderma*, and from the bacteria of the genera *Bacillus* and *Thermobifida*. The conversion of cellobiose to glucose is carried out by the enzyme β-glucosidase. By the term "β-glucosidase", it is meant any enzyme that hydrolyses the glucose dimer, cellobiose, to glucose.

In addition, there are several accessory enzymes that aid in the enzymatic digestion of cellulose (see co-owned WO 2009/026722 (Scott), which is incorporated herein by reference, and Harris et al., 2010, Biochemistry, 49:3305-3316). These include EGIV, also known as Cel61, swollenin, expansin, lucinen and cellulose-induced protein (Cip). Glucose can be enzymatically converted to the dimers gentiobiose, sophorose, laminaribiose and others by beta-glucosidase via transglycosylation reactions.

An appropriate cellulase dosage can be about 1.0 to about 40.0 Filter Paper Units (FPU or IU) per gram of cellulose, or any amount therebetween. The FPU is a standard measurement familiar to those skilled in the art and is defined and measured according to Ghose (Pure and Appl. Chem., 1987, 59:257-268; which is incorporated herein by reference). A preferred cellulase dosage is about 10 to 20 FPU per gram cellulose.

The enzymatic hydrolysis can be conducted at a pH between about 4.0 and 7.0. If acid pretreatment is utilized, the pH of the feedstock will be increased with alkali to about pH 4.0 to about 7.0 prior to enzymatic hydrolysis, or more typically between about 4.0 and about 6.0. The optimal pH range of most cellulases is between pH 4.0 and 6.0. However, cellulases with pH optima at more acidic and more alkaline pH values could be used. As discussed below, the addition of alkali at this stage of the process produces salts that can be recovered for use as a fertilizer, depending on the identity of the alkali used in the process.

The temperature of the slurry is adjusted so that it is within the optimum range for the activity of the cellulase enzymes. Generally, a temperature of about 45° C. to about 70° C., or about 45° C. to about 65° C., or any temperature therebetween, is suitable for most cellulase enzymes. However, the temperature of the slurry may be higher for thermophilic cellulase enzymes.

The hydrolysis may be conducted simultaneously with fermentation in a simultaneous saccharification and fermentation, also referred to as "SSF". SSF is typically carried out at temperatures of 35 to 38° C., which is a compromise between the 50° C. optimum for cellulase and the 28° C. optimum for yeast.

The stream resulting from hydrolysis may comprise process chemicals, salts, proteins, and other organics derived from the feedstock, and an insoluble solids phase, comprised of lignin, unreacted polysaccharide, and other water insoluble components. Lignin may be separated from the hydrolysate at this stage of the process or may be carried through to fermentation.

Fermentation

Fermentation of the sugar is carried out to produce the fermentation product.

The fermentative production of alcohol may be carried out with yeast or bacteria. A yeast that may be used for ethanol production is a *Saccharomyces* spp. yeast. Glucose and any other hexoses present in the sugar stream may be fermented to ethanol by wild-type *Saccharomyces cerevisiae*, although genetically modified yeasts may be employed as well.

The fermentation is typically conducted at a pH between about 4.0 and about 6.0, or between about 4.5 and about 6.0. To attain the foregoing pH range for fermentation, it may be necessary to add alkali to the fermentation sugar feed stream. The fermentation sugar feed stream will comprise one or more sugar monomers derived from cellulose, hemicellulose or both polymeric components. Sugar monomers derived from cellulose include glucose, while hydrolysis of the hemicellulose component yields such sugars as xylose, glucose, arabinose, mannose, galactose, or a combination thereof.

Xylose and arabinose that are derived from the hemicellulose may also be fermented to a fermentation product by a yeast strain that naturally contains, or has been engineered to contain, the ability to ferment these sugars to ethanol. Examples of microbes that have been genetically modified to ferment xylose include recombinant *Saccharomyces* strains into which has been inserted either (a) the xylose reductase (XR) and xylitol dehydrogenase (XDH) genes from *Pichia stipitis* (U.S. Pat. Nos. 5,789,210, 5,866,382, 6,582,944 and U.S. Pat. No. 7,527,927 and European Patent No. 450,530) or (b) fungal or bacterial xylose isomerase (XI) gene (U.S. Pat. Nos. 6,475,768 and 7,622,284). Examples of yeasts that have been genetically modified to ferment L-arabinose include, but are not limited to, recombinant *Saccharomyces* strains into which genes from either fungal (U.S. Pat. No. 7,527,951) or bacterial (WO 2008/041840) arabinose metabolic pathways have been inserted.

A typical temperature range for the fermentation of glucose to ethanol using *Saccharomyces cerevisiae* is between about 25° C. and about 38° C., although the temperature may be higher if the yeast is naturally or genetically modified to be thermostable. The dose of the fermentation microorganism will depend on factors, such as the activity of the fermentation microorganism, the desired fermentation time, the volume of the reactor and other parameters. These parameters may be adjusted as desired to achieve optimal fermentation conditions.

The fermentation may also be supplemented with additional nutrients required for the growth of the fermentation microorganism. For example, yeast extract, specific amino acids, phosphate, nitrogen sources, salts, trace elements and vitamins may be added to the fermentation sugar feed stream to support their growth.

Fermentation of the sugar produces a fermented mixture comprising the fermentation product. The fermented mixture comprises organic and inorganic components, including any components added during the fermentation to support growth of the microorganisms.

Recovery of the Fermentation Product

By recovering the fermentation product from the fermented mixture, it is meant removing the fermentation product from the fermented mixture to make the fermentation product more concentrated and purer in one or more stages.

In an embodiment of the invention, the fermentation product is an alcohol. A conventional technique for recovering alcohol in more concentrated and purer form is distillation. As used herein, the term "distillation" also encompasses steam and vacuum stripping. Other techniques include membrane dehydration, pervaporation carried out directly on the fermented mixture or to replace concentration steps after distillation (such as molecular sieves).

The fermentation beer that is sent to distillation is a dilute alcohol solution. Microorganisms are potentially present depending upon whether or not they are removed from the beer by filtration or other means prior distillation of the beer. The beer may additionally contain any components added during the fermentation to support growth of the microorganisms. The beer will also contain any organics that have not been consumed by the microorganisms, along with soluble and insoluble inorganic salts.

The beer is pumped through one or more distillation columns to separate the alcohol from the other components in the beer. The column(s) in the distillation unit is preferably operated in a continuous mode, although it should be understood that batch processes are also encompassed by the present invention. Furthermore, the column(s) may be operated at any desired pressure or vacuum. Heat for the distillation process may be added at one or more points either by direct steam injection or indirectly via heat exchangers. The distillation unit may contain one or more separate beer and rectifying columns, or a distillation column may be employed that comprises an integral enriching or rectification section. The alcohol vapour is further purified to fuel grade ethanol specification by removing residual water vapour by any of several well-known techniques.

The ethanol vapor is further purified to fuel grade specification by removing residual water or water vapor by any of several well-known or later-developed techniques.

When the alcohol has a higher boiling point than water, such as butanol, the distillation is run to remove the water and other volatile compounds from the alcohol. The water vapor exits the top of the distillation column and is known as the "overhead stream".

Lignin Separation

The insoluble lignin may be recovered during the production process or it may be carried through to the still bottoms. If insoluble lignin is recovered, it may be obtained from any stage of the production process. This is typically after the pretreatment, although processes are known in which lignin is recovered in earlier stages of the production process. Without being limiting, streams from which the lignin can be separated include the hydrolysate stream comprising glucose resulting from enzymatic hydrolysis, the fermentation beer stream or the still bottoms stream remaining after distillation. It should be understood that unconverted cellulose and other insoluble components may be carried forward with the lignin during the lignin separation.

The lignin may be separated using conventional solid-liquid separation techniques prior to any further processing. Such separation techniques may include the use of pressure or vacuum filters, centrifugal filters or centrifuges, membrane filtration systems or gravity settlers. The solids content of the lignin stream resulting from the separation is typically greater than about 30 wt %, more typically greater than about 50 wt %. The lignin may or may not be washed to recover additional sugars and to remove process chemicals. Without being limiting, a particularly suitable device for lignin separation is a filter press.

Still Bottoms Recovery

Recovery of the still bottoms involves obtaining the still bottoms remaining after concentration of the fermentation product, such as from the bottom of a distillation column or beer column. Without being limiting, the recovery may encompass processing steps prior to providing the still bottoms for use in soil conditioning or land application. However, after processing, inorganic and organic components remain. Non-limiting examples of processing steps that may be carried out on the still bottoms includes concentration, including solid/liquid separation techniques, to produce still bottoms enriched in solids. Moreover, solids in the still bottoms may settle, for example during storage, and these solids may be recovered and used for soil conditioning or land application. Optionally, a liquid component obtained from the still bottoms is also provided for use in soil conditioning or land application, along with the still bottoms solids or as a separate product for land application.

According to the present invention, there is no or limited recovery of inorganic salt from the still bottoms. As mentioned, inorganic salts provide nutrients for plant growth and/or improve soil condition. The still bottoms provided for use in a land application will generally comprise at least about 50 wt %, or at least about 75 wt %, or more preferably at least about 80 wt % of the inorganic salts present in the original stream fed to the step of recovering the still bottoms. Furthermore, other components can be recovered from the still bottoms prior to its use in a land application, such as organic acids, including acetic acid.

According to certain embodiments of the invention, the still bottoms are not subjected to any waste water treatment, such as biological treatment prior to its use in a land application. By biological treatment it is meant that biocatalysts such as microorganisms or enzymes are not added to the still bottoms prior to land application. For example, in one example of the invention, the still bottoms is not treated by anaerobic digestion or aerobic digestion prior to its use in a land application. In a further example of the invention, the still bottoms are not treated by anaerobic digestion prior to its use in a land application.

According to certain embodiments of the invention, the still bottoms are not subjected to chemical treatment. By this it is meant that process chemicals are not added to the still bottoms, such as acids, bases, oxidants or flocculents.

Non-limiting examples of methods for concentration of the still bottoms that may be carried out include evaporation, centrifugation, membrane separation, settling or other suitable techniques. In some embodiments of the invention, between about 10% and about 90% (w/w), or between about 30% and about 90% (w/w) of the liquid is removed from the still bottoms prior to its recovery for use in a land application.

In one embodiment of the invention, concentration of the still bottoms is carried out in an evaporator unit. The evaporation may be carried out in a single-stage evaporator or may be part of a multiple-effect system. Those of skill in the art can readily choose a suitable operating temperature for the evaporator unit. In embodiments of the invention, the operating temperature of the evaporator unit can be between about 40° C. and about 145° C. It will be understood that the temperature is measured at the operating pressure, which is typically under vacuum or at atmospheric pressure, but can be at higher pressure.

The still bottoms can be stored prior to being supplied for use in land application. Storage is carried out in any suitable containment means, such as tanks, basins or lagoons. The still bottoms can be agitated or there may be no agitation during storage. Ventilation and/or odour control methods may be utilized if required.

As would be appreciated by those of skill in the art, storage requirements would typically be based on agricultural growing seasons and the location of the production facility. For instance, when supplying the soil conditioning composition in the spring or fall, storage would generally occur during the winter. Storage requirements may also depend on the geographic location of the production facility as this will have an impact on the growing season.

Soil Conditioning Composition

The present invention also provides a soil conditioning composition, which is a composition applied to the land with the objective of improving soil condition, nutrient levels in plant tissue, plant growth or a combination thereof, relative to no fertilizer application. Improvements in soil condition include increasing nutrients in the land and increasing organic content. The soil conditioning composition may be composed solely of still bottoms, although other components may be added as well including manure, or other components set forth below.

The soil conditioning composition comprises an organic component and an inorganic component originating from the still bottoms. According to certain embodiments, the soil conditioning composition comprises: still bottoms comprising: about 40-80 wt % organic components; and about 20-60 wt % inorganic components on a dry basis. For example, the soil conditioning composition may comprise about 40, 45, 50, 55, 60, 65, 70, 75, 80 wt % organic components and 20, 25, 30, 35, 40, 45, 50, 55 and 60 wt % inorganic components on a dry basis. The compositional analysis of the still bottoms, including determination of the content of organic components, inorganic components, sulfur, nitrogen, phosphorus or other components described herein is carried out after concentrating the still bottoms, such as, but not limited to evaporation, if such a step is carried out. If the still bottoms is not concentrated, then the compositional analysis is just after distillation. Furthermore, such compositional analysis will be carried out on the still bottoms itself if no additional components are present in the soil condition composition. If additional components besides still bottoms are present, the analysis is conducted after the addition or such components. The nitrogen (N), phosphorus (P), potassium (K) and sulfur (S) content of the still bottoms are reported on a dry basis using the method of Example 1 to determine total dry solids. Nitrogen, phosphorus and potassium content are determined by digestion using a sulfuric acid and hydrogen peroxide method followed by inductively coupled plasma atomic emission spectroscopy (ICP-AES) to determine N, P and K content (Thomas et al., 1967, Agronomy Journal, 59:240-243, which is incorporated herein by reference). Sulfur is determined using $HNO_3$ and $HClO_4$ digestion followed by ICP-AES to determine S content (Blanchar et al., 1965, Soil Science of America Journal 29:71-72, which is incorporated herein by reference).

According to preferred embodiments, the inorganic component of the soil conditioning composition comprises at least nitrogen and sulfur. The organic component preferably comprises at least soluble lignin.

By the term "process chemical", it is meant a chemical added at any stage during the production of the fermentation product from the lignocellulosic feedstock and/or subsequent steps to concentrate the fermentation product. This includes any chemical added during or before the production of sugar, fermentation and/or concentration of the fermentation product that results in the production of inorganic salt. Without being limiting, the process chemical may be used to adjust the pH of a process stream, provide nutrients for a biological process, such as fermentation, or decontaminate a process stream.

Process chemicals added to the feedstock or process streams may include acid and alkali. For example, acid or alkali may be used to pretreat or hydrolyze the lignocellulosic feedstock and/or may be added to a process stream to adjust its pH prior to a biological treatment such as enzymatic hydrolysis of cellulose and/or fermentation to a value amenable to the enzyme and/or microorganism used in the fermentation. The acid or alkali process chemical may also be added to provide nutrients to a microorganism used for fermentation and/or prevent the growth of unwanted microorganisms. The acid may be selected, for example, from sulfuric acid and phosphoric acid and the alkali may be selected from ammonia, ammonium hydroxide, potassium hydroxide and lime. In further embodiments, the acid is selected from sulfuric acid and phosphoric acid and the alkali is selected from ammonia, ammonium hydroxide and potassium hydroxide. The reaction of the acid and alkali produces inorganic salts, often significant amounts. Examples of inorganic salts arising from the neutralization of the process chemicals that may be present in the still bottoms include ammonium sulfate, potassium sulfate, calcium sulfate, ammonium phosphate, potassium phosphate and combinations thereof. In one embodiment, the inorganic salts include ammonium sulfate, ammonium phosphate, potassium sulfate, potassium phosphate, or a combination thereof. In a further embodiment, the inorganic salts comprise ammonium sulfate or potassium sulfate. In yet further embodiments, the inorganic salts comprise at least ammonium sulfate.

Inorganic salts present in the soil conditioning composition may also arise from the feedstock itself. Without being limiting, lignocellulosic feedstock often has a pH of between 6 and 10 due to the presence of the alkali minerals, such as potassium, sodium and calcium salts. Such alkali minerals may include potassium carbonate, sodium carbonate and calcium carbonate. Magnesium carbonate may be present as well depending on the feedstock.

As discussed, the soil conditioning composition may comprise sulfur, which arises from the use of sulfur-containing process chemicals, such as sulfuric acid in the production process. Sulfur in the still bottoms may exist in the form of sulfate and/or bisulfate salts. This may include sulfate and/or bisulfate salts of ammonium, potassium, sodium, calcium, magnesium or combinations thereof. According to one embodiment of the invention, the sulfur-containing salts present in the still bottoms include, without limitation, potassium sulfate, potassium bisulfate, sodium sulfate, sodium bisulfate, calcium sulfate, magnesium sulfate, ammonium sulfate and combinations thereof. Preferably, the sulfur-containing salts include at least ammonium sulfate, potassium sulfate or calcium sulfate. In another example of the invention, the sulfur-containing salt includes ammonium sulfate or calcium sulfate. In a further embodiment, the sulfur-containing salt includes ammonium sulfate. These salts are produced by reaction of sulfuric acid with salts present in the incoming feedstock, such as during pretreatment, and/or reaction of sulfuric acid with alkali that is added as a process chemical, as described above, and/or during sulfuric acid addition during a step of reducing the pH of a stream during fermentation to kill unwanted microorganisms.

According to certain embodiments of the invention, the soil conditioning composition has a sulfur content of between about 1.0 and about 15 wt %, between about 1.0 and about 12 wt %, between about 1.5 and about 12 wt % or between about 2.0 and about 8 wt % as measured on a dry basis. In yet further embodiments, the still bottoms has a sulfur content of between about 0.5 and about 15 wt %, between about 0.5 and about 12 wt % or between about 0.5 and about 8 wt %. The sulfur content may include ranges having numerical limits of about 0.5, 1.0, 1.5, 2.0, 3.0, 4.0, 5.0, 6.0, 7.0, 8.0, 9.0, 10, 11, 12, 13, 14 or 15 wt % as measured on a dry basis.

The soil conditioning composition may also comprise nitrogen, which arises, at least in part, from the addition of nitrogen-containing process chemicals, such as ammonia or ammonium hydroxide. Nitrogen may also arise from protein present in the feedstock. The nitrogen-containing process chemical may be added during pretreatment, after pretreatment to adjust the pH of a stream prior to biological treatment, or to provide nutrients during fermentation. Nitrogen in the still bottoms may exist in the form of ammonium salts. This may include ammonium salts of sulfate and/or chloride. According to one embodiment of the invention, the nitrogen-containing salts present in the still bottoms include, without limitation, at least ammonium sulfate.

According to certain embodiments, the soil conditioning composition has a nitrogen content of between about 2.0 and about 12 wt %, between about 2.0 and about 10 wt %, or between about 2.0 and about 8 wt % on a dry basis. In further embodiments, the soil conditioning composition has a nitrogen content of between about 1.0 and about 15 wt %, between about 1.0 and about 12 wt %, between about 1.0 and about 10 wt % or between about 1.0 and about 8 wt % on a dry basis. The nitrogen content may include ranges having numerical limits of about 0.5, 1.0, 1.5, 2.0, 3.0, 4.0, 5.0, 6.0, 7.0, 8.0, 9.0, 10, 11, 12, 13, 14 or 15 wt % as measured on a dry basis.

Other nutrients that may be present in the soil conditioning composition include chloride, iron, magnesium, boron, or a combination thereof. According to certain embodiments of the invention, the soil conditioning composition comprises chloride. The chloride content in the soil conditioning composition may be between about 0.1 and 2.0 wt % on a dry basis. The soil conditioning composition may be applied to soils that are deficient in chloride.

According to some examples of the invention, the still bottoms in the soil conditioning composition contains minimal phosphorus. The amount of phosphorus present generally will depend on the feedstock used in the method and from where it is sourced. Without being limiting, the soil conditioning composition may contain less than 2 wt % phosphorus, more preferably, less than 1 wt % phosphorus on a dry basis, as measured based on the still bottoms component of the composition. Low levels or the absence of phosphorus are advantageous for applications in which the still bottoms are blended with manure. Manure often contains high levels of phosphorus and thus blending the still bottoms with manure reduces or eliminates over-applying this nutrient to the soil, while at the same time increases the concentration of desirable nutrients, such as nitrogen and sulfur. Thus, the soil conditioning composition of the invention blended with manure, has a more balanced nutrient profile than manure alone.

The organics in the soil conditioning composition may comprise, without limitation, insoluble and/or soluble lignin, lignin derived compounds, residual carbohydrates, non-fermented sugars, polyols, fermentation solids or a combination thereof. Preferably, the organic component comprises at least soluble lignin. The organic component may include soluble and insoluble components. According to some embodiments of the invention, the organics do not include insoluble lignin.

The soluble lignin content of the soil conditioning composition may be between about 5.0 and about 50 wt %, or between about 10 and about 20 wt % on a dry basis, as measured based on the still bottoms component of the composition.

Insoluble lignin and unconverted solids may also be present if these components are not removed in upstream stages of the process. Preferably, insoluble lignin is removed in upstream stages prior to recovery of the still bottoms. According to some embodiments of the invention, insoluble lignin is removed from a process stream prior to recovery of the still bottoms and then mixed with the still bottoms.

Advantageously, the soil conditioning composition of the present invention does not contain significant quantities of carbohydrate. Carbohydrate is a valuable substrate that is used to produce fermentable sugar. Typically, the soil conditioning composition will comprise less than 2 wt % or 1 wt % cellulose or hemicellulose, which is derived from the lignocellulosic feedstock fed to the production process. Cellulose and hemicellulose are measured on a dry basis on the still bottoms component of the composition.

The soil conditioning composition may contain between about 10 and about 88 wt % moisture, or between about 25 and about 45 wt % moisture.

As noted, in addition to still bottoms, other components may be included in the soil conditioning composition. These components include a residue, byproduct or waste from the processing of plant biomass. Such residue, byproduct or waste may originate from the above-described production process itself that uses a lignocellulosic feedstock as a starting material to make a fermentation product. An example of such a component is lignin. In further embodiments, the still bottoms may be combined with a residue, byproduct or waste from the processing of a sugar or starch crop to make a food or non-food product.

Thus, according to certain embodiments, the present invention provides a method comprising: (i) providing still bottoms from a process that produces a fermentation product from a lignocellulosic feedstock; and (ii) combining the still bottoms with a residue, byproduct, or waste from the processing of a plant biomass to produce a soil conditioning composition. The plant biomass may be a sugar crop, a starch crop or a lignocellulosic feedstock. The residue, byproduct or waste may include sugar cane bagasse, vinasse, corn fiber, distillers grain, lignin or a combination thereof. In one embodiment, the plant biomass is a sugar crop or a starch crop. The sugar crop or starch crop may include corn, wheat, barley, rye, sorghum, rice, potato, cassava, sugar beet, sugar cane, or a combination thereof. In a further embodiment of the invention, the residue, byproduct or waste is sugar cane bagasse, vinasse, or a combination thereof, from the processing of sugar cane.

Use of the Composition as a Soil Conditioner

The soil conditioning composition or still bottoms is provided for use in a land application. This includes transporting or arranging for the transportation of the soil conditioning composition or still bottoms to a farming operation. A suitable transportation method is trucking. By the term "land application", it is meant applying the soil conditioning composition or still bottoms using any known or later-developed technique for adding or incorporating the soil conditioning composition or still bottoms to a field, including, but not limited to, irrigation equipment or liquid manure injection systems. The field to which the soil conditioning composition or still bottoms is applied may or may not be tilled or worked in any way prior to the land application.

The soil conditioning composition or still bottoms may be stored at a farming operation prior to use. Storage is carried out in any suitable containment means, such as tanks, basins or lagoons. The soil conditioning composition or still bottoms can be agitated or there may be no agitation during storage. Ventilation and/or odour control methods may be utilized if required during storage. As would be appreciated by those of skill in the art, storage requirements would typically be based on agricultural growing seasons and the location of the farming operation. Agitation could be required before application and after a storage period to ensure a somewhat homogenous product.

According to some embodiments of the invention, the soil conditioning composition or still bottoms that is applied to the soil comprises manure. The manure may be added to the soil conditioning composition or still bottoms during storage.

The soil conditioning composition or still bottoms may contain between about 10 and about 88 wt % moisture. Preferably, the soil conditioning composition or still bottoms has a solids consistency that enables it to be applied to land using conventional equipment in a farming operation. By this it is meant that the soil conditioning composition or still bottoms has sufficient liquid content that it is capable of being pumped or otherwise applied to a field by farm equipment such as irrigation equipment or by farming equipment that are conventionally used to apply manure or liquid fertilizer to fields at a farming operation, such as by spreading, spraying or injecting. Preferably, the soil conditioning composition or still bottoms is a liquid composition that is capable of flowing or being pumped. At elevated solids consistencies it is contemplated that distributor systems could be utilized as is the case with bedded manure or thicker slurries.

Where the material does not flow readily, equipment used for solid manure applications is contemplated for land application. Alternatively, liquid, in any form, can be added back to the soil conditioning composition or still bottoms so it can be handled as a liquid slurry. Land application of the soil conditioning composition or still bottoms by irrigation equipment or using other farm equipment is particularly advantageous in that it allows a farming operation to use conventional equipment and methods that are currently practiced in the industry. Thus, a farming operation need not change their current techniques for applying organic amendments to a field (such as manure) when applying the soil conditioning composition or still bottoms of the present invention. Accordingly, this saves on capital and operating costs that would otherwise be required.

The application rate of the soil conditioning composition or still bottoms to soil may depend on recommended application rates, which in turn are based on soil condition and nutrient requirements. Soil condition may be determined by carrying out a soil analysis test. It is particularly beneficial to apply the soil conditioning composition or still bottoms of the invention to sandy soils, or soils that are prone to water and wind erosion, thereby introducing organic content to the soil, along with nutrients.

EXAMPLES

Example 1: Determination of the Total Solids Concentration in Lignocellulosic Still Bottoms The determination of the total solids (TS) content of still bottoms is carried out as follows.

A still bottoms sample is transferred to a pre-weighed aluminum tin and the mass of the tin and sample is determined gravimetrically. The sample is then oven dried at 105° C. to constant mass (typically 24 hours). The combined mass of the dried solids and tin are measured gravimetrically. The total solids content is calculated by dividing the dried sample mass by the initial sample mass and expressed as a percentage.

Example 2: Determination of the Organic Components in Lignocellulosic Still Bottoms The organic components in a still bottoms sample are determined by quantifying identified and unidentified components. The percentage organic component is measured by weight on a dry basis using the method set out in Example 1 to determine the total dry solids content. Sugars, including glucose, xylose and arabinose are measured by HPLC using a CarboPac™ PA1 column (4×250 mm) consisting of a 10 µm diameter polystyrene/divinylbenzene substrate agglomerated with 580 nm MicroBead quaternary ammonium functionalized latex (2% cross linkage) and a 100 µeq/column anion exchange capacity (4×250 mm).

Organic acids such as acetic acid, lactic acid, glucuronic acid and galacturonic acid are measured using high performance liquid chromatography (HPLC) on a Dionex system, with an IonPac®AS11-HC column (4×250 mm) that consists of a 9 µm diameter ethylvinylbenzene polymer cross linked with 55% divinylbenzene polymer agglomerated with a 70 nm alkanol quaternary ammonium latex (6% latex cross linkage) and a capacity of 290 µeq/column (4×250 mm).

The lignin content of the sample was measured via ultraviolet absorbance (UV) at 205 nm using absorption coefficients to estimate the concentration.

The protein concentration was determined using the Kjeldahl nitrogen measurement, using a factor of 6.25 to convert from the measured nitrogen value to the protein content. The Kjeldahl nitrogen measurement is carried out as described in Standard Methods for the Examination of Water and Wastewater, 21$^{st}$ Edition, 2005, ppg. 4-131-4132, ref #4500-N$_{org}$ B, BUCHI Instructions Distillation Unit K-355, which is incorporated herein by reference.

There is also a fraction of the total organic content that is of unknown identity. The total mass of this fraction was determined from a total organic carbon (TOC) measurement. The theoretical TOC content of the known components was subtracted from the total TOC to estimate the unknown organic carbon content. The TOC is measured using a Sievers InnovOx (Innovative Oxidation) Laboratory and On-Line Total Organic Carbon (TOC) Analyzer based on Supercritical Water Oxidation (SCWO). The technique brings water to a supercritical state by heating a water sample inside a sealed reactor module to 375° C. and raising the pressure to 3200 psi. Under these conditions, water is neither a gas nor a liquid, but exhibits beneficial properties of both. The TOC measurement is carried out as described in Standard Methods for the Examination of Water and Wastewater, 21$^{st}$ Edition, 2005, ppg. 5-19-5-22, ref #5310 or as set forth in U.S. Pat. No. 8,114,676, both which are incorporated herein by reference.

Example 3: Determination of the Inorganic Components in a Still Bottoms Composition from Processing a Lignocellulosic Feedstock The determination of the inorganic components in the still bottoms of the invention is carried out as follows. The percentage inorganic component is measured by weight on a dry basis using the method set out in Example 1 to determine the total dry solids content.

Anions such as chloride, phosphate and sulfate are measured using high performance liquid chromatography (HPLC) on a Dionex system, with an IonPac®AS11-HC column (4×250 mm) that consists of a 9 µm diameter ethylvinylbenzene polymer cross linked with 55% divinylbenzene polymer agglomerated with a 70 nm alkanol quaternary ammonium latex (6% latex cross linkage) and a capacity of 290 µeq/column (4×250 mm).

Cations such as sodium, potassium, magnesium and calcium are measured using a Dionex system, with an IonPac®CS16 column (5×250 mm) that consists of a 5.5 µm diameter ethylvinylbenzene polymer cross linked with 55% macroporous divinylbenzene polymer (100 Å) agglomerated with carboxylic acid functional groups and a capacity of 8400 µeq/column (5×250 mm).

Example 4: Nutrient Profile of a Still Bottoms Stream

This example shows the nutrient profile of a still bottoms stream obtained from a process that produces a fermentation product from a lignocellulosic feedstock. FIG. 1 shows the nitrogen, phosphorus, potassium and sulfur content of a still bottoms stream, as well as the soluble lignin and moisture content.

The values in the figure are based on still bottoms in which wheat straw was pretreated with sulfuric acid under conditions described in U.S. Pat. No. 7,754,457, which is incorporated herein by reference. After pretreatment, the pretreated feedstock slurry is pH adjusted to a value between 4 and 6 with ammonia to produce a pretreated feedstock slurry comprising ammonium sulfate, and the cellulose in the slurry is hydrolyzed with cellulase enzymes to a produce a hydrolyzed slurry comprising glucose. After enzymatic hydrolysis, lignin and other insoluble components are removed from the hydrolyzed slurry by a filter press. The filtered stream is sent to a fermentation that is conducted with a *Saccharomyces cerevisiae* strain capable of fermenting glucose and xylose to ethanol. Fermentation results in a beer that is sent to distillation and molecular sieves for concentration of ethanol. The still bottoms remaining after distillation is evaporated in an evaporator to a moisture content of 53.7 wt %. Ammonium sulfate from the neutralization of the pretreated feedstock is carried through to the still bottoms.

As can be seen in FIG. 1, the still bottoms comprise nitrogen, potassium and sulfur at levels that can increase the nutrient content of soil. As illustrated in FIG. 1, there is no phosphorus present, although the content can vary depending on the batch. This is particularly advantageous, since manure often contains high levels of phosphorus and thus blending the still bottoms with manure reduces or eliminates over-applying this nutrient to the soil, while at the same time increasing the concentration of desirable nutrients, such as nitrogen and sulfur. Therefore, blending the still bottoms with manure yields a soil conditioning composition that has a more balanced nutrient profile than manure alone.

In addition, the moisture content of the still bottoms is high enough that the still bottoms stream can be pumped, which allows it to be applied to the land using current practices.

Example 5: Test Results of Land Application of Still Bottoms

This example demonstrates that land application of the still bottoms provides nutrients to crops at similar levels provided by a chemical fertilizer. The results presented below show that leaf tissue sulfur, phosphorus, potassium and nitrogen in crops treated with still bottoms were present at levels similar to plants treated with chemical fertilizer. The health and condition of the crop was also determined by measuring chlorophyll content in plant leaves and the data collected show that chlorophyll content was similar in studies using still bottoms and chemical fertilizer. In addition, test results show that the still bottoms did not have a negative impact on plant population relative to the application of chemical fertilizer. Together, these results show that the still bottoms derived from lignocellulosic feedstock can provide benefits to crops that are similar to those achieved with chemical fertilizer.

In this example, still bottoms samples resulting from the production process described in Example 4 were used to treat corn crops of the variety Dekalb 6323. The batch used in the land application study was analyzed for nutrient content and the results of this analysis are presented in Table 1 below. Weight percentages are measured on a dry basis.

TABLE 1

Nutrient analysis of still bottoms

| Nutrient | Concentration |
|---|---|
| Total N (wt %) | 4.8 |
| S (wt %) | 1.7 |
| K (wt %) | 0.5 |
| Mg (wt %) | 0.5 |
| P (wt %) | 0.3 |
| Ca (wt %) | 0.05 |
| Cu (ppm) | 4 |
| Fe (ppm) | 13 |
| Mn (ppm) | 72 |
| Zn (ppm) | 1.0 |

Chemical fertilizer and still bottoms were applied at 5 rates based on N (0, 50, 100, 150, and 200 lbs N/acre). Sulfur fertilizer was also applied at equivalent rates supplied by the still bottoms stream. Individual plots in the field were 15×50 ft. Before planting, a chisel was used to form ridges in the soil and liquid still bottoms was manually applied for control of amount and uniformity. A disk operation followed to level the soil. The experimental design consisted of a randomized complete block with 4 replications.

The nitrogen application rate was adjusted based on a sample analysis conducted at the time that the still bottoms were applied to the crop. The nitrogen application rate (in both lbs/acre and kg/ha) at the 5 rates tested for the chemical fertilizer and still bottoms is provided in Table 2 below.

TABLE 2

Final nitrogen application rate for chemical fertilizer and still bottoms

| Treatment | Fertilizer | Still bottoms | Fertilizer | Still bottoms |
|---|---|---|---|---|
| | lbs/acre | | kg/ha | |
| 1 | 50 | 41 | 56 | 46 |
| 2 | 100 | 83 | 112 | 93 |
| 3 | 150 | 124 | 168 | 139 |
| 4 | 200 | 166 | 224 | 185 |

At the six-leaf (V6) growth stage, the aboveground plant parts were harvested and weighed for the fresh weight. Plant materials were washed to remove soil particles and dried in a forced air oven at 60° C. for 4 days (or until constant weight is achieved) and weighed (to obtain dry weight) for biomass calculation. Once dried, plants were ground with a Wiley grinder and stored in appropriate air-tight vials. Sub-samples of ground plant materials were digested using a sulfuric acid and hydrogen peroxide method (Thomas et al., 1967, Agronomy Journal, 59:240-243, which is incorporated herein by reference) and analysed with inductively coupled plasma atomic emission spectroscopy (ICP-AES) for N, P and K. Another sub-sample of ground plant material were digested using $HNO_3$ and $HClO_4$ (Blanchar et al., 1965, Soil Science of America Journal 29:71-72, which is incorporated herein by reference) and analysed for S by ICP-AES.

Figure 2A:
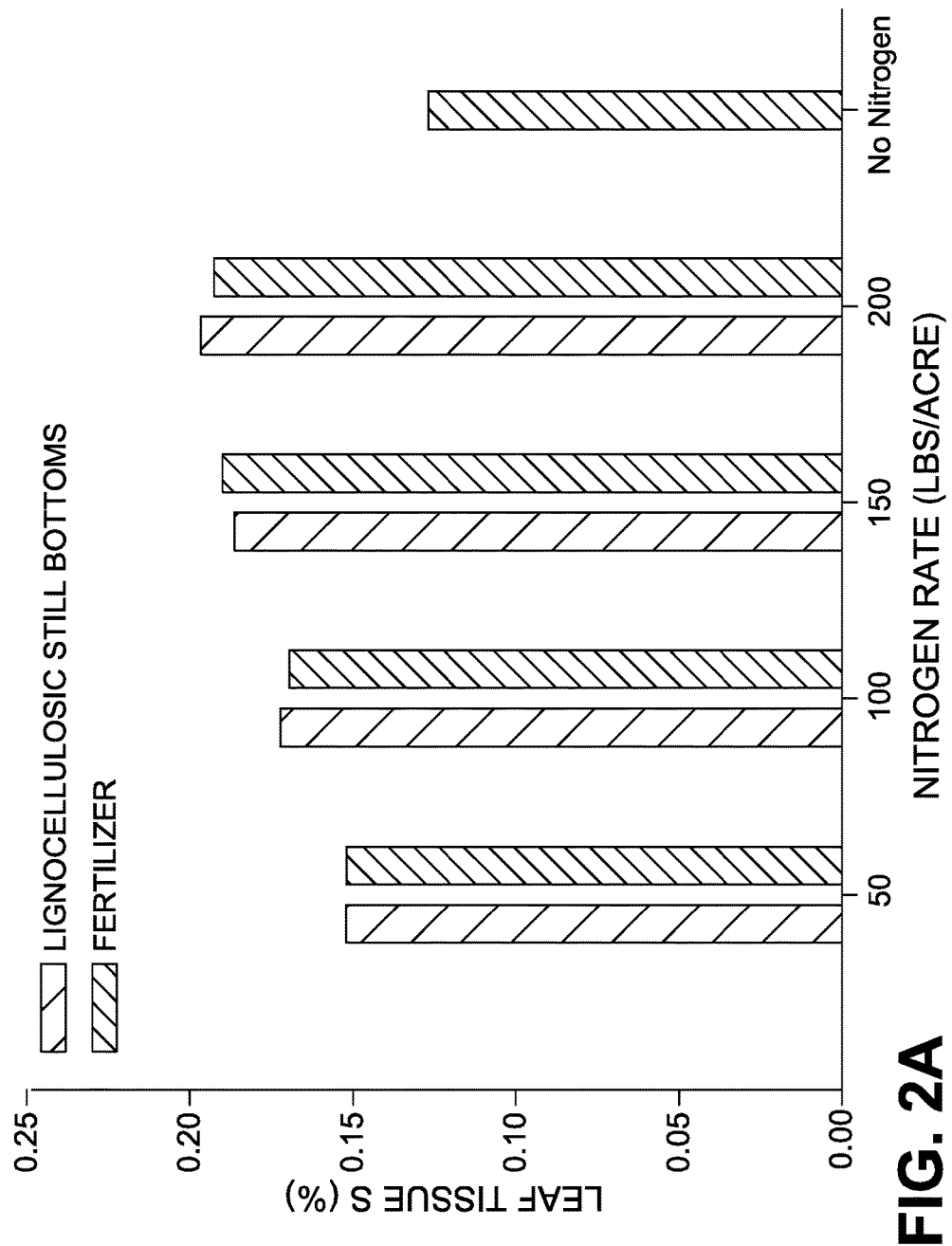
FIG. 2A is a bar graph showing the leaf tissue sulfur (S) content (%) of corn samples after application of still bottoms (first bars) and chemical fertilizer (second bars) to corn crops at nitrogen rates of 50, 100, 150 and 200 lbs/acre. Results are also shown with no fertilizer (labeled no nitrogen).
Figure 2B:
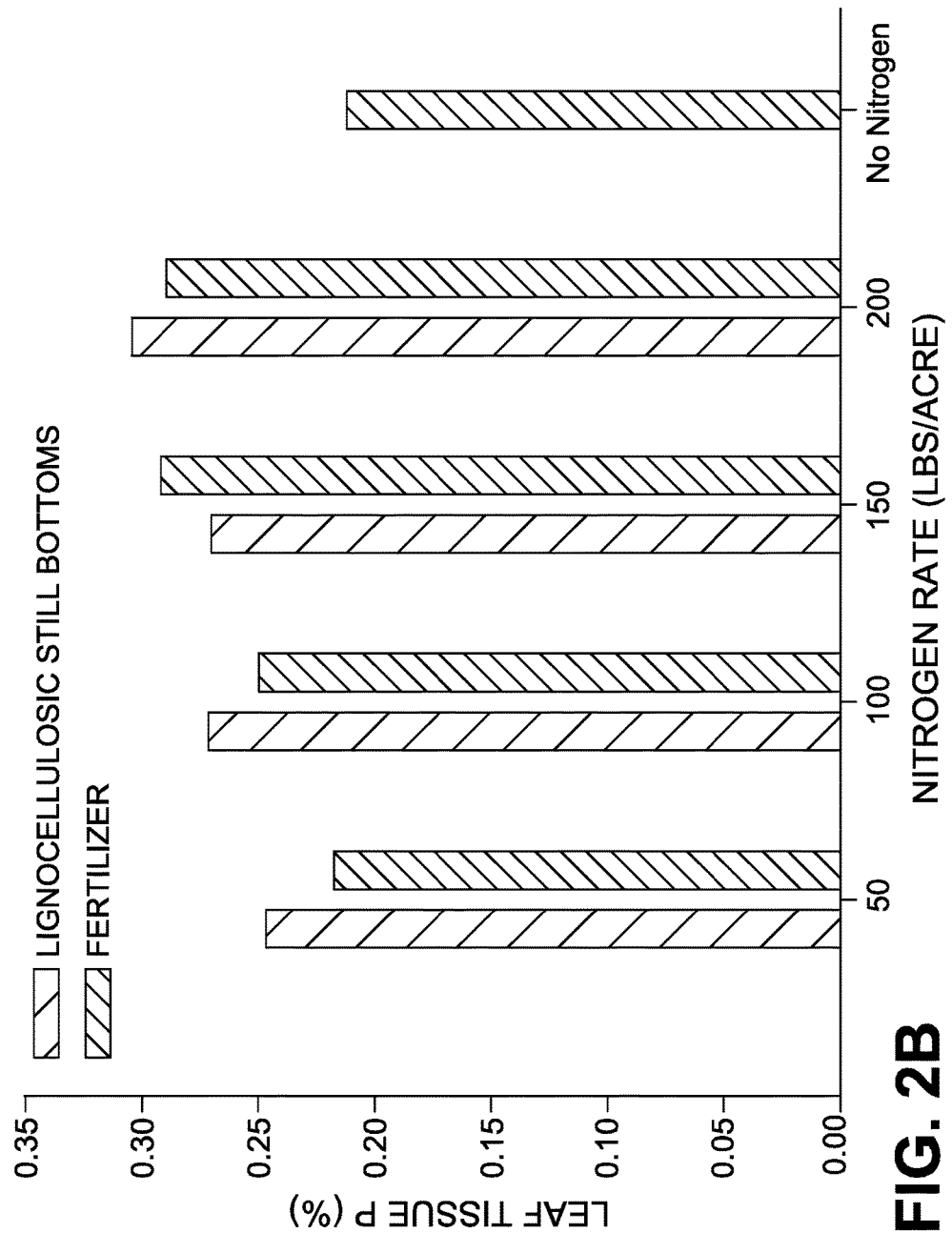
FIG. 2B is a bar graph showing the leaf tissue phosphorus (P) content (%) of corn samples after application of still bottoms (first bars) and chemical fertilizer (second bars) to corn crops at nitrogen rates of 50, 100, 150 and 200 lbs/acre. Results are also shown with no fertilizer (labeled no nitrogen).
Figure 2C:
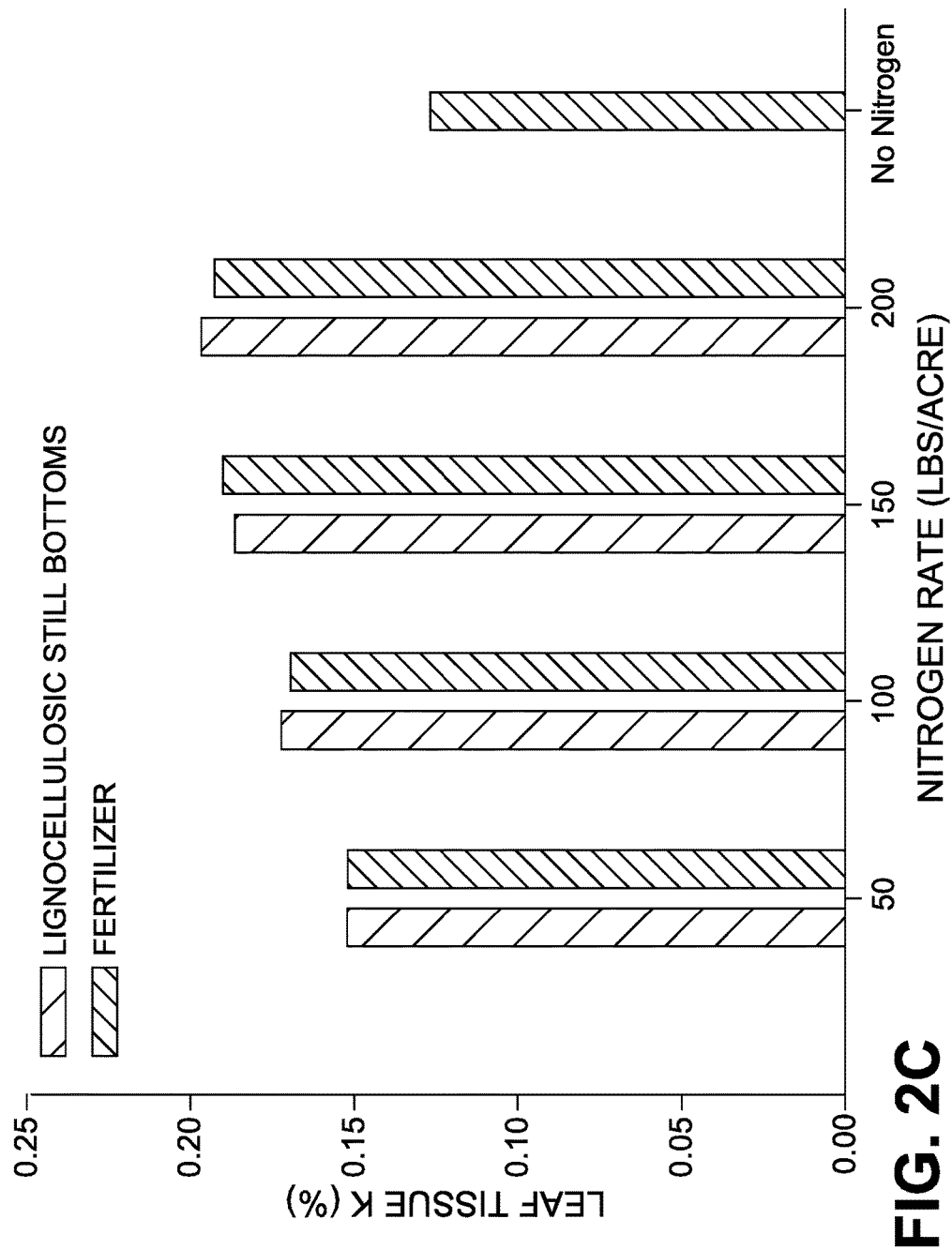
FIG. 2C is a bar graph showing the leaf tissue potassium (K) content (%) of corn samples after application of still bottoms (first bars) and chemical fertilizer (second bars) to corn crops at nitrogen rates of 50, 100, 150 and 200 lbs/acre. Results are also shown with no fertilizer (labeled no nitrogen).
Figure 2D:
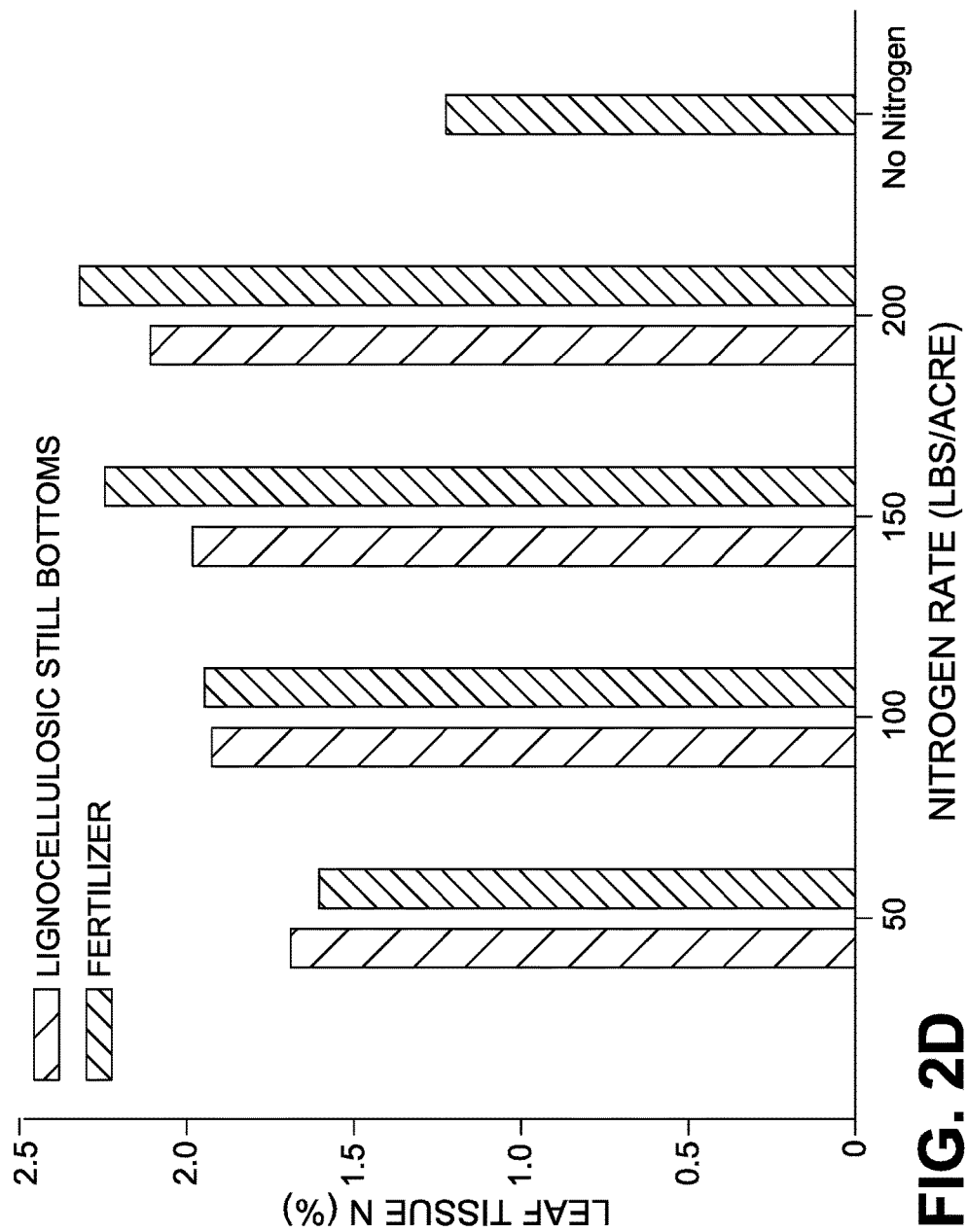
FIG. 2D is a bar graph showing the leaf tissue nitrogen (N) content (%) of corn samples after application of still bottoms (first bar) and chemical fertilizer (second bar) to corn crops at nitrogen rates of 50, 100, 150 and 200 lbs/acre. Results are also shown with no fertilizer (labeled no nitrogen).

The results of the nutrient analysis on the plant material are presented in FIGS. 2A-D. FIG. 2A shows the leaf tissue content of sulfur for still bottoms and fertilizer at the given nitrogen application rates measured in lbs/acre. At each application rate, the leaf tissue sulfur levels were comparable for still bottoms and chemical fertilizer. FIGS. 2B, 2C and 2D show the leaf tissue content of phosphorus, potassium and nitrogen, respectively, for still bottoms and fertilizer at the given nitrogen application rates measured in lbs/acre. For each plant nutrient measured, the leaf tissue content of the elements was similar for both still bottoms and chemical fertilizer. In FIG. 2D, the leaf tissue nitrogen content was slightly less for the still bottoms samples than the fertilizer, but this is likely due to the lower nitrogen application rate of the still bottoms stream (see Table 2 above).

Figure 3:
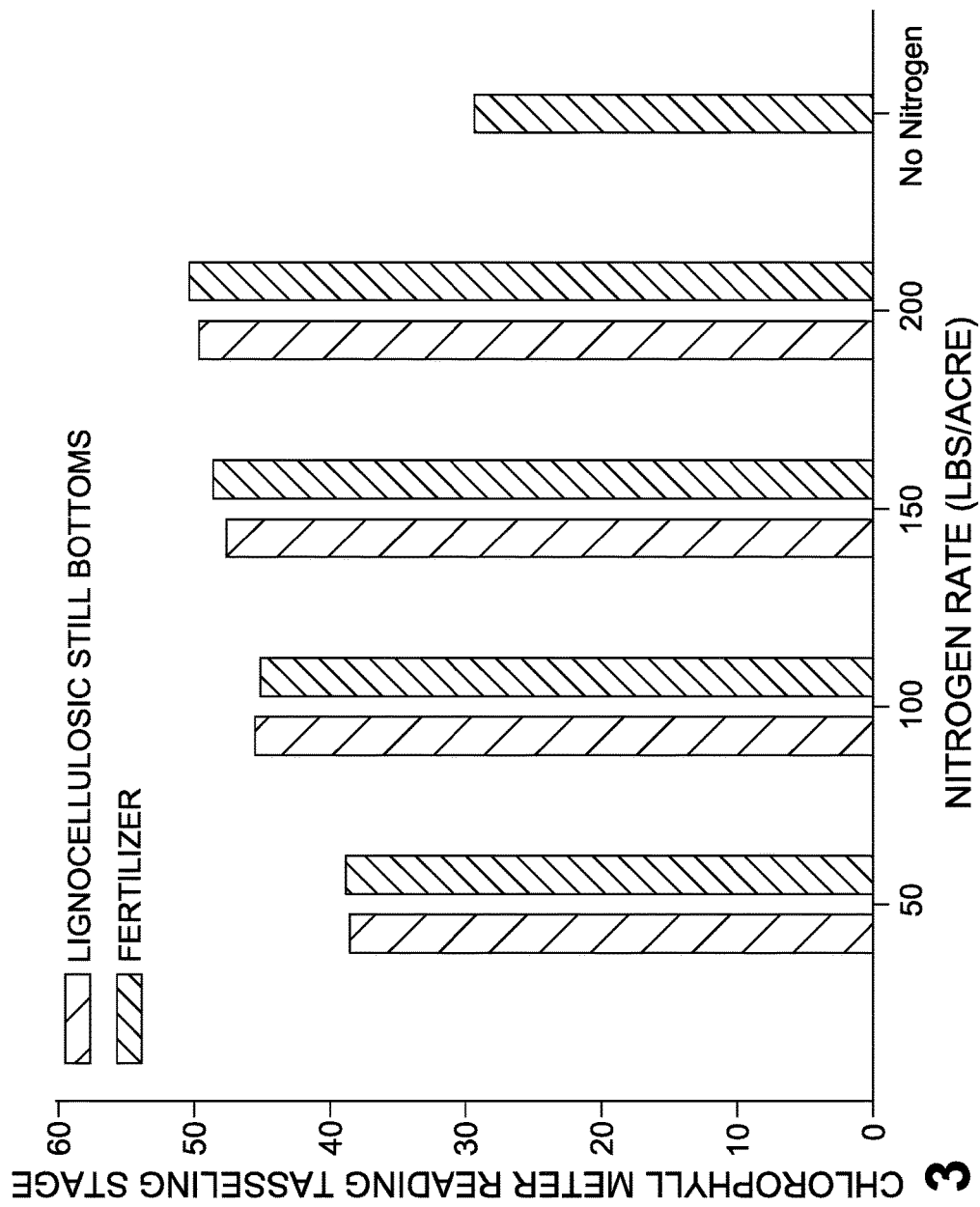
FIG. 3 is a bar graph showing the chlorophyll content at the tasseling stage of corn after application of still bottoms (first bars) and chemical fertilizer (second bars) to corn crops at nitrogen rates of 50, 100, 150 and 200 lbs/acre. Results are also shown with no fertilizer (labeled no nitrogen).

Chlorophyll in plant tissue was also measured after application of still bottoms and the chemical fertilizer. The results are depicted in FIG. 3, which shows the chlorophyll meter reading at the tasseling stage of the corn at each nitrogen application rate tested. Chlorophyll content provides an indication of the health and condition of a plant. As can be seen in FIG. 3, the chlorophyll readings were similar for treatment with still bottoms and chemical fertilizer.

Figure 4:
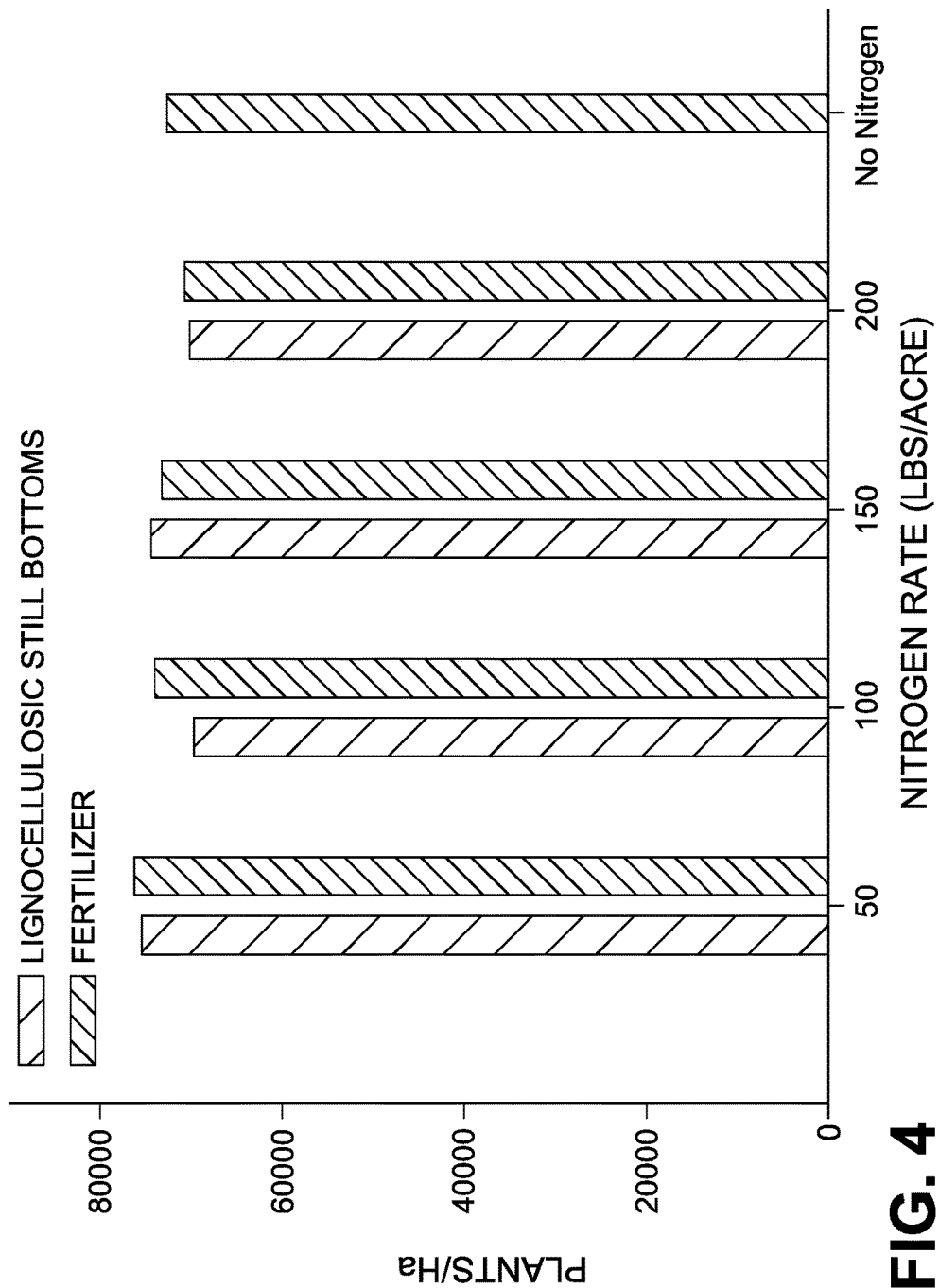
FIG. 4 is a bar graph showing corn plants/hectare after application of still bottoms (first bars) and chemical fertilizer (second bars) to corn crops at nitrogen rates of 50, 100, 150 and 200 lbs/acre. Results are also shown with no fertilizer (labeled no nitrogen).

The impact of still bottoms and fertilizer application on the population of the corn crop was also analyzed. An analysis of variance between groups (ANOVA analysis) indicated that there was no statistically significant difference of plant population after land application of still bottoms or the fertilizer (results not shown). Results presented in FIG. 4 show plants/hectare at each nitrogen application rate for still bottoms and chemical fertilizer application. The plants/hectare were similar for still bottoms and chemical fertilizer application at each application rate tested. These results show that still bottoms were not toxic to the plants.

The invention claimed is:

1. A process for producing a fuel from lignocellulosic feedstock, said fuel comprising ethanol, said process comprising:

(i) treating the lignocellulosic feedstock to produce sugar;
(ii) fermenting the sugar to produce a fermented mixture comprising the ethanol;
(iii) recovering the ethanol from the fermented mixture in one or more stages to produce a concentrated ethanol and still bottoms;
(iv) recovering the still bottoms, said still bottoms comprising an organic component and an inorganic component; and
(v) applying the still bottoms comprising the organic component and the inorganic component to land as a soil conditioner,
wherein applying the still bottoms to the land returns at least one member selected from the group consisting of organic matter and nutrients back to the land.

2. The process of claim 1, wherein the still bottoms applied to land as a soil conditioner comprises 40-80 wt % organic components and 20-60 wt % inorganic components on a dry basis.

3. The process of claim 1, wherein the inorganic components originate from the lignocellulosic feedstock, process chemicals added during said process, or a combination thereof.

4. The process of claim 1, wherein the inorganic components originate from both the lignocellulosic feedstock and process chemicals added during said process.

5. The process of claim 1, wherein the step of recovering the still bottoms comprises concentrating the still bottoms.

6. The process of claim 1, wherein the organic component comprises dissolved lignin, insoluble lignin or a combination thereof.

7. The process of claim 1, wherein the still bottoms has a phosphorus content of less than 2 wt % on a dry basis.

8. The process of claim 1, wherein the still bottoms has a solids content that allows it to be pumped through farming equipment.

9. The process of claim 1, wherein the step of recovering the still bottoms comprises separating solids from the still bottoms, thereby producing a residue stream composed of separated solids and a liquid component and wherein the separated solids and the liquid component are each provided for use in soil conditioning.

10. The process of claim 1, wherein the step of treating comprises pretreating the lignocellulosic feedstock with acid or alkali to produce a composition comprising cellulose and hydrolyzing at least a portion of the cellulose to glucose with enzymes.

11. The process of claim 1, comprising adding insoluble lignin to the still bottoms prior to step (v).

12. The process of claim 1, wherein said ethanol is characterized by a sustainability improvement provided by using less chemical fertilizer to restore nutrient levels to the land, said sustainability improvement being relative to a process wherein nutrients are returned back to the land by chemical fertilizers.

13. The process of claim 1, wherein said ethanol is characterized by a greenhouse gas emissions reduction associated with using less chemical fertilizer to restore nutrient levels to the land.

14. The process of claim 1, wherein said ethanol is characterized by a greenhouse gas emissions reduction associated with applying the still bottoms to the land.

15. A process for producing a fuel from lignocellulosic feedstock, said fuel comprising ethanol, said process comprising:
(i) treating the lignocellulosic feedstock to produce sugar;
(ii) fermenting the sugar to produce a fermented mixture comprising the ethanol;
(iii) recovering the ethanol from the fermented mixture in one or more stages to produce concentrated ethanol and still bottoms;
(iv) recovering the still bottoms, said recovered still bottoms comprising 40-80 wt % organic component and 20-60 wt % inorganic component, said organic component comprising at least soluble lignin, said inorganic component comprising at least nitrogen and sulfur; and
(v) applying the still bottoms comprising the organic component and the inorganic component to land as a soil conditioner,
wherein the life cycle greenhouse gas emissions of the ethanol is reduced relative to life cycle greenhouse gas emissions of ethanol produced by an otherwise identical fuel production process that does not apply the still bottoms to land as a soil conditioner, and
wherein said reduction is at least in part a result of step (v).

16. The process of claim 15, wherein the organic component further comprises sugar, insoluble lignin, or a combination thereof.

17. The process of claim 15, wherein the inorganic component further comprises potassium, chloride, magnesium, calcium or a combination thereof.

18. The process of claim 15, wherein the phosphorus content is less than about 2 wt % on a dry basis.

19. The process of claim 15, wherein the water content is between about 10 and about 90 wt %.

20. The process of claim 15, wherein the water content is between about 20 and about 50 wt %.

21. A process for producing a fuel from lignocellulosic feedstock, said fuel comprising ethanol, said process comprising:
(i) treating the lignocellulosic feedstock to produce sugar;
(ii) fermenting the sugar to produce a fermented mixture comprising ethanol;
(iii) recovering the ethanol from the fermented mixture in one or more stages to produce recovered ethanol and still bottoms;
(iv) recovering the still bottoms, said recovered still bottoms comprising 40-80 wt % organic component and 20-60 wt % inorganic component, said organic component comprising at least soluble lignin, said inorganic component comprising at least nitrogen and sulfur; and
(v) conditioning soil by applying the still bottoms comprising the organic component and the inorganic component to land,
wherein the life cycle greenhouse gas emissions of the ethanol is reduced relative to life cycle greenhouse gas emissions of ethanol produced by an otherwise identical fuel production process that includes disposing of the still bottoms by incineration rather than applying the still bottoms to land.

* * * * *